No. 616,075.  
J. A. CALDWELL.  
BACK PEDALING BRAKE.  
(Application filed June 3, 1897.)  
Patented Dec. 20, 1898.
(No Model.)
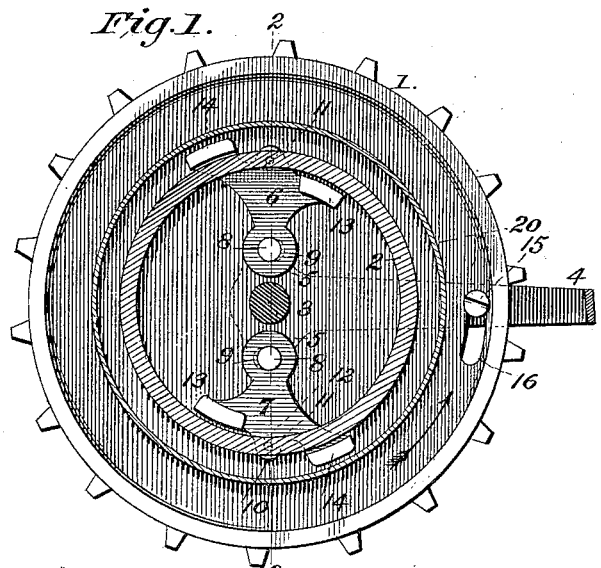
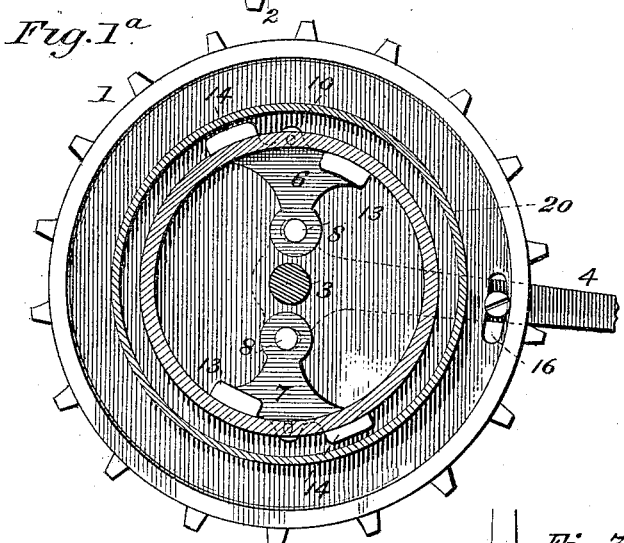
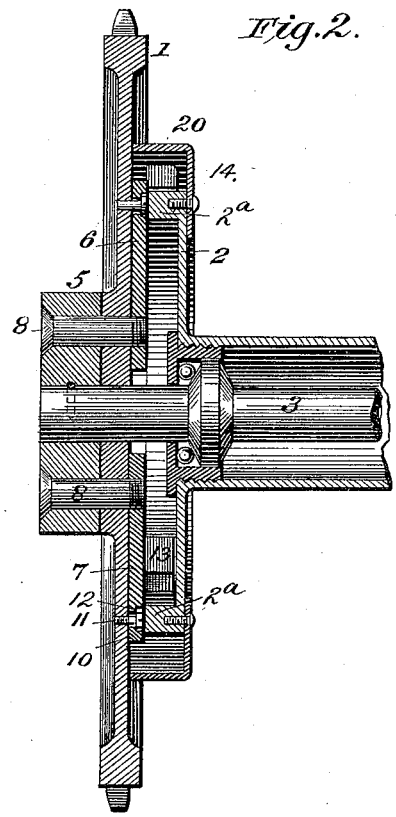
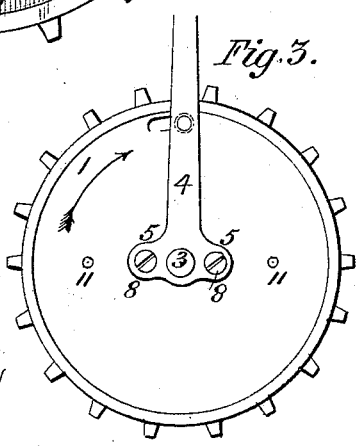
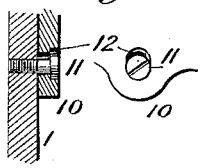
WITNESSES:  
E. W. Cormic  
Edwin L. Bradford
INVENTOR  
J. A. Caldwell  
BY Fred G. Dieterich  
ATTORNEY
THE NORRIS PETERS CO., PHOTO-LITHO., WASHINGTON, D. C.

UNITED STATES PATENT OFFICE.

JOHN A. CALDWELL, OF VANCOUVER, CANADA.

BACK-PEDALING BRAKE.

SPECIFICATION forming part of Letters Patent No. 616,075, dated December 20, 1898.

Application filed June 3, 1897. Serial No. 639,317. (No model.)

*To all whom it may concern:*

Be it known that I, JOHN A. CALDWELL, of Vancouver, in the Province of British Columbia and Dominion of Canada, have invented certain new and useful Improvements in Bicycle-Brakes; and I do hereby declare the following to be a full, clear, and exact description of the invention, such as will enable others skilled in the art to which it appertains to make and use the same.

This invention relates to improvements in that class of brakes in which the retarding application to the drive mechanism is effected by back-pedaling; and it has for its object to provide a brake mechanism of this character of a very simple and effective construction which can be conveniently operated by the rider to gradually or quickly slow up the momentum of the machine.

The invention consists in the novel construction and peculiar combination of parts, such as will be first described in detail and then be specifically pointed out in the appended claims, reference being had to the accompanying drawings, in which—

Figure 1 is a side elevation of a sprocket-wheel with my improvements applied, parts being shown in section, the crank and brake clutches being shown in their driving position. Fig. 1$^a$ is a similar view, the parts being shown in their braking position. Fig. 2 is a vertical section taken on the line 2 2 of Fig. 1. Fig. 3 is a view of the outer face of the sprocket-wheel and the pedal-crank, said crank being in its driving position. Fig. 4 is a detail view hereinafter referred to.

In its practical construction my invention embodies a sprocket-wheel loosely mounted on the crank-axle and having a limited free rotary movement thereon, a brake-rim fixedly connected with the crank-axle hanger or frame, a pedal-crank having a free limited movement on the crank-axle and connected with the sprocket-wheel, and the brake devices carried by the sprocket-wheel adapted to be moved into engagement with the fixed brake mechanism by back pressure on the loose pedal-crank.

Referring now to the drawings, in which like numerals indicate like parts in all the figures, 1 indicates a sprocket-wheel which is loosely mounted on the axle 3, journaled on the crank-hanger in any approved manner.

2 indicates a brake-disk which may be integrally formed with or attached to the crank-hanger and has an annular brake-rim 2$^a$, which fits the sprocket-wheel, as shown in Fig. 2.

The axle 3, which is threaded, extends through the wheel 1 and carries the pedal-crank 4, which crank engages the threads and has a limited movement independent of the axle sufficient to cause the brake-shoes hereinafter described to engage the brake-wheel. At the point of connection with the axle 3 the crank has diametrically opposite extending ears 5, which carry screws 8, which extend through concentrically-arranged slots 9 in the sprocket-wheel 1. To the inner ends of the screws 8 are pivotally hung brake-shoes or clutches 6 and 7.

The outer portion of the clutches or brake-shoes 6 and 7 have ears 10, pivotally connected with the sprocket-wheel web by the screws 11 to prevent binding and to provide for a slight irregular movement of the clutches or brake-shoes, the ends 10 thereof having a slight free movement on the screws 11 by reason of the radially-extending slots in the said ends 10, as clearly shown in Fig. 4.

The brake shoes or clutches 6 and 7 have lugs 13 and 14 annularly arranged and projecting, respectively, over the inner and outer face of the brake-rim 2$^a$, so as to grip such rim both externally and internally at opposite sides of the pivot or fulcrum point of the said clutches 6 and 7.

The crank 4 has a stud or pin 15, which projects through the segmental slots 16 in the web of the sprocket-wheel, which pin 15, when a push action is applied to the crank 4, seats in the forward end of the slot 16, and thereby fixedly connects the sprocket-wheel with the crank-axle and causes it to rotate therewith, it being understood that in practice when turned to its propelling position the crank has a fixed rotation with the crank-axle. When the crank is held to move forward, the ears 5 assume the position shown in Fig. 1, which rocks the clutches radially in line with the axle 3. When in this position, the lugs 13 and 14 are held free from the rim 2$^a$, the parts being in their driving position.

By arranging the several parts in the manner shown and described it is manifest that by a slight back-pedaling pressure on the crank 4 its pin 15 will leave its seat in the slot 16, and thereby free the wheel 1 from a fixed connection with the axle 3. As the crank 4 is thus moved backward its lugs 5 will carry the screws rearwardly on the slots 9, and thereby swing the clutches to the position shown in Fig. 1ᵃ to cause the lugs 13 and 14 to simultaneously engage the rim 2, it being obvious that this operation may be effected gradually or quickly at the will of the rider. By arranging the shoes or locks to engage the opposite sides of the friction-rim any tendency of the shoes or rim to wear uneven is thereby overcome.

By arranging the several parts as shown the brake devices are rendered substantially dust-proof, as all of the parts of the braking device (except the lugs 14) are held within the rim 2ᵃ, and to render the parts entirely dust-proof a supplemental casing 20 is provided, secured to the rim 2, which encircles the lugs 14, as clearly shown in Figs. 1 and 2.

By connecting the pedal-cranks to oppositely-disposed brake-clamps a great leverage pedaling is obtainable by very slight back-pedaling pressure.

Furthermore, the construction shown avoids the use of powerful springs for holding the parts to their normal position, such as is used in some known devices of this kind.

While I prefer to arrange the parts as shown in the drawings, it is manifest that minor changes in the detail arrangement thereof may be made without departing from the scope of the appended claims.

Having thus described my invention, what I claim, and desire to secure by Letters Patent, is—

1. In a bicycle-brake of the kind described, the combination with the crank-shaft, the pedal-crank having a limited movement independent of the shaft, the loosely-mounted sprocket drive-wheel having diametrically oppositely disposed concentric slots 9, means for joining said wheel to the pedal-crank to cause them to move together, said pedal-crank having oppositely-extending ears 5, the brake-shoes 6 and 7 pivotally hung on the sprocket-wheel, the pins 8, extended through the slots 9, and joining the brake-shoes 6 and 7, with the crank-ears 5, said brake-shoes having brake-lugs 13 and 14 adapted positively to engage the inner and outer faces of the brake-rim, all being arranged substantially as shown and for the purposes described.

2. In a brake mechanism, the crank-shaft, the normal free driving-sprocket thereon, and the crank-arm on the said sprocket having a limited movement independent of the axle, combined with a brake-rim fixedly secured to the crank-axle frame, oscillating brake-shoes pivotally hung on the sprocket-wheel, said shoes having brake-lugs located at opposite sides of the pivots of the brake-clutches and arranged to engage the inner and outer faces of the fixed brake-rim, and intermediate connections between the crank-axle and the said lugs, whereby such lugs are oscillated by the reverse movements of the crank, substantially as shown and for the purposes described.

3. In a brake mechanism, the combination with the crank-axle, the brake-disk having an inwardly-projecting rim, the sprocket-wheel loosely mounted on the crank-axle and having elongated oppositely-disposed concentrated slots, the brake-shoes pivotally hung on the sprocket-wheel, said shoes having brake-lugs 13 and 14, arranged to positively engage the inner and outer faces of the brake-rim, such lugs being disposed at opposite sides of the pivot-axis of the shoes, the pedal-crank having a limited rearward movement on the axle, said crank having at its free point oppositely-disposed lugs 5, and the screws 8 projected through the slots of the sprocket-wheel for joining the swinging end of the shoes with the projecting lugs of the pedal-crank and means for locking the crank and the sprocket-wheel to move forward together, all being arranged substantially as shown and for the purposes described.

4. In a brake mechanism, the combination with the crank axle or shaft, the hanger having a fixed annular or brake rim, the sprocket drive-wheel loosely mounted on the crank-axle, having slots 9, the brake-shoes 6 and 7 pivotally hung on the sprocket-wheel and having a brake-rim engaging lugs 13 and 14, the housing 20, the crank 4, having a limited movement independent of the axle, means for connecting the crank and the sprocket-wheel to move together in unison, said crank having oppositely-projected ears 5, and the members 8 for connecting the shoes with the ears of the crank, all being arranged substantially as shown and for the purposes described.

In testimony whereof I have signed this specification in the presence of two subscribing witnesses.

JOHN A. CALDWELL.

Witnesses:
D. R. G. BALLANTYNE,
J. M. SINCLAIR.